UNITED STATES PATENT OFFICE.

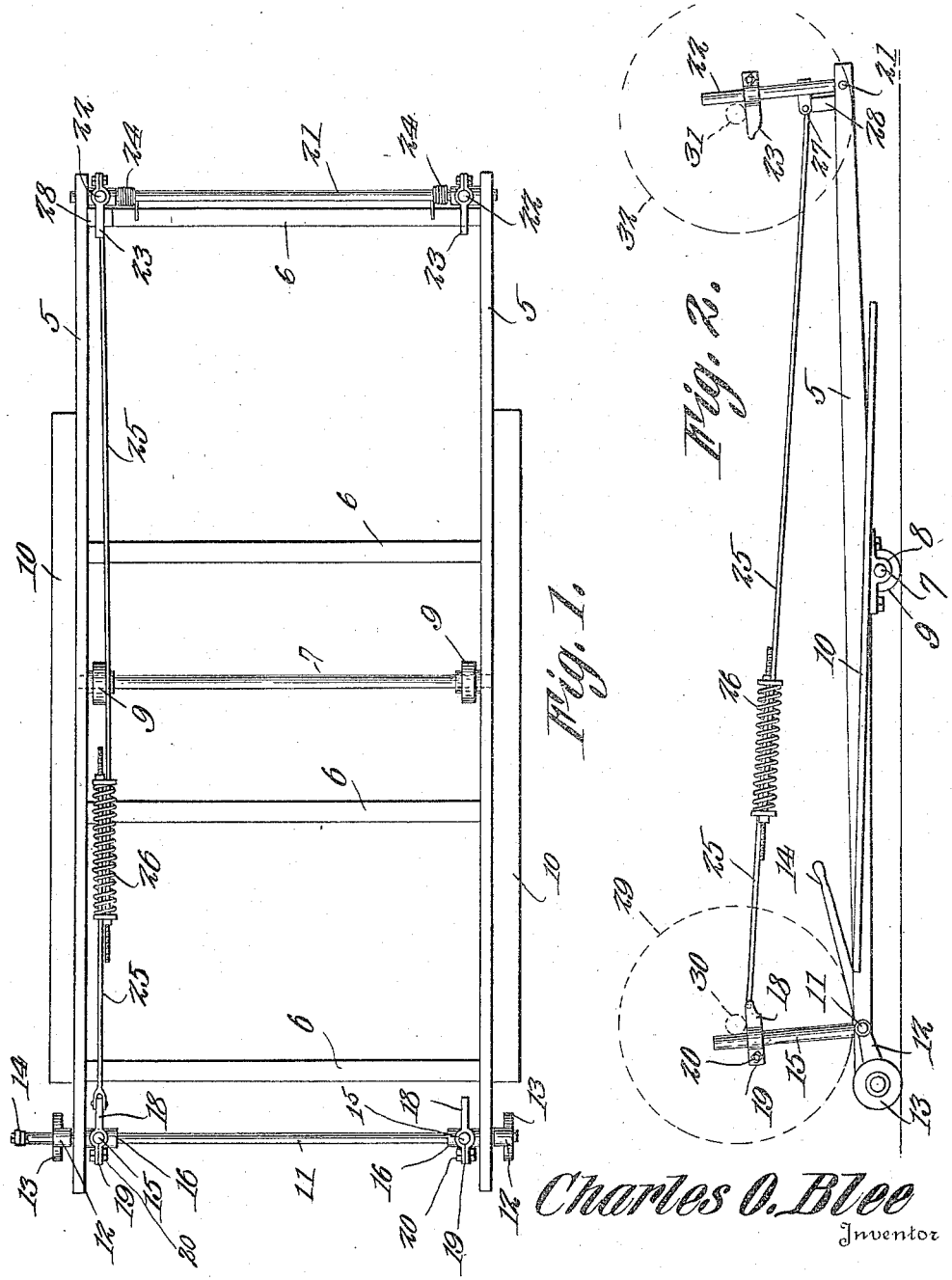

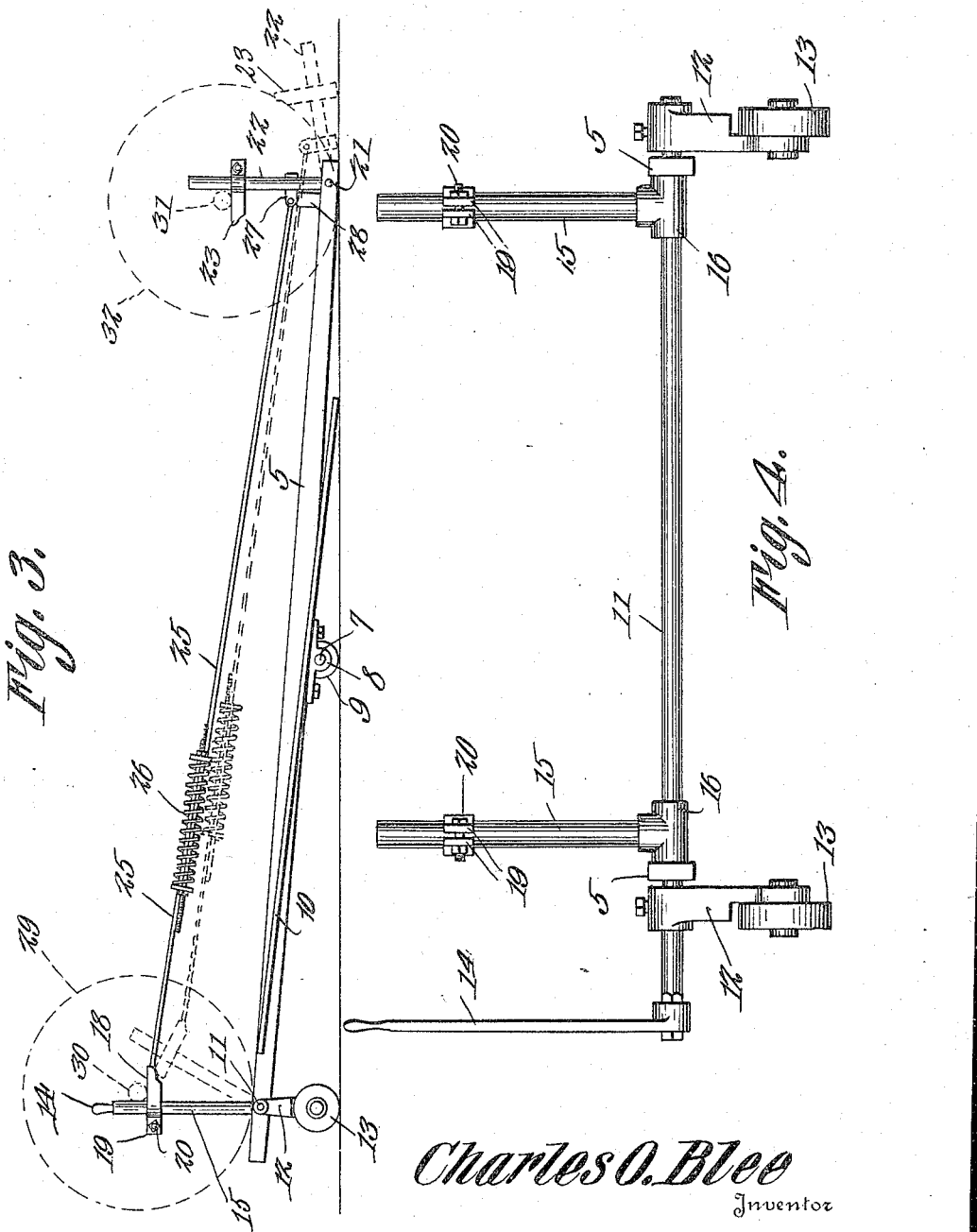

CHARLES O. BLEE, OF FORT WAYNE, INDIANA, ASSIGNOR OF TWO-THIRDS TO WILLIAM O. CHANEY AND GEORGE F. SEYMOUR, BOTH OF FORT WAYNE, INDIANA.

LIFTING DEVICE FOR MOTOR-VEHICLES.

1,193,451.     Specification of Letters Patent.     Patented Aug. 1, 1916.

Application filed October 5, 1915. Serial No. 54,170.

*To all whom it may concern:*

Be it known that I, CHARLES O. BLEE, a citizen of the United States, residing at Fort Wayne, in the county of Allen and State of Indiana, have invented certain new and useful Improvements in Lifting Devices for Motor-Vehicles, of which the following is a specification.

This invention relates to lifting devices designed for use in garages and other places where motor vehicles are stored when not in service, and the object of the invention is to provide a novel and improved device for lifting the car a sufficient distance from the ground or floor so as to take all weight off the tires, and also to render the wheels and other parts of the car readily accessible for inspection, repairs, etc.

The invention also has for its object to provide a lifting device of the kind stated which is simple in construction and efficient in operation.

With the objects stated in view, the invention consists in a combination and arrangement of parts to be hereinafter described and claimed, and in order that the same may be better understood, reference is had to the accompanying drawings, in which—

Figure 1 is a plan view of the device; Figs. 2 and 3 are side elevations showing the parts in different positions, and Fig. 4 is an elevation of the front end of the device.

Referring specifically to the drawing 5 denotes two tiltable lifting bars which are connected in parallelism and laterally spaced relation by cross bars 6. The lifting bars are fulcrumed intermediate their ends on a transverse shaft 7, the under sides of the bars having bearing supports 8 for said shaft. By means of wheels 9 mounted on the shaft, the apparatus can be rolled about on the floor of the garage or other place where the device is used, and the car supported by the device can therefore be readily shifted and positioned where desired.

On the outer edge of each lifting bar 5 is mounted an inclined runway 10 one end of which reaches down to the floor, and the other end terminates a short distance back of the forward end of the bar. The runway extends on opposite sides of the fulcrum 7 of the bar, and the end which reaches down to the floor is to the rear of the fulcrum, whereas the opposite end is in front thereof, the incline being upward toward the last mentioned end. The rear end of the runway terminates some distance in front of the rear end of the lifting bar.

The forward ends of the lifting bars 5 support a rock shaft 11, the same extending transversely between said bars, and projecting therefrom. On the ends of this shaft are fixed brackets 12 carrying rollers 13, and to one end of the shaft is fixed a hand lever 14 for rocking the same. The brackets and the rollers carried thereby serve as props to hold the forward ends of the lifting bars elevated as will be described hereinafter.

Between the lifting bars 5, and adjacent thereto, the shaft 11 carries pivoted supporting members for the front axle of the car, said members being located in advance of the forward ends of the runways 10. Each of these supporting members comprises a post 15 secured to a coupling 16 through which the shaft loosely passes. The outer end of the post carries a bracket arm 18 having a split inner end 19 shaped to embrace the post, and to which it is clamped by a bolt 20.

The rear ends of the shifting bars 5 are connected by a transverse shaft 21 carrying pivoted supports for the rear axle of the car. These supports consist of posts 22 having bracket arms 23, the structure being the same as the supports of the front axle hereinbefore described. Springs 24 are connected to the shaft 21 and to arms 22 in such a manner that the latter are normally held down on the floor as shown dotted in Fig. 3.

The front and rear axle supports are connected by a rod 25 which is in two sections, said sections being yieldingly connected by a suitable spring coupling 26. The forward end of the rod is connected to the bracket arm 18 of one of the posts 15, and the rear end of the rod is connected to the post 22, on the same side, on a bracket 27 on said post. One of the lifting bars 5 has a top abutment 28 which is in the path of the bracket 27 and limits the forward swing of the posts 22, as well as the posts 15.

In the normal position of the parts, the rear ends of the runways 10 and the corresponding ends of the lifting bars 5 are down on the floor. The front ends of the lifting bars are held elevated by the props composed of the parts 12 and 13, the rock shaft 11 having been swung by the hand lever 14 to lower the props to this position. The rear axle supports are down and resting on the floor, and the front axle supports are in upright position, with a slight rearward incline. The car is now driven over the device from the rear end thereof, and steered so that the front wheels (shown dotted at 29) mount the runways 10. The front props still prevent the lifting bars from tilting. Just before the front wheels reach the upper forward ends of the runways and roll off the same, the front axle of the car (shown dotted at 30) strikes the posts 15 and comes above the bracket arms 18. The momentum of the car swings the posts 15 forward to perpendicular position, and through the connection 25 and 26, the rear posts 22 are swung upward to perpendicular position, bringing the bracket arms 23 beneath the rear axle (shown dotted at 31). The front wheels 29 are now free of the runway and the forward end of the car is supported by the bracket arms 18. The rear wheels of the car (shown dotted at 32) are still supported on the floor. The hand lever 14 is now operated to swing the props upward sufficiently to allow the front ends of the lifting bars to tilt downward and their rear ends to tilt upward, leaving the car supported on the bracket arms 18 and 23 with all the wheels free of the floor, as shown in Fig. 2. This tilting movement of the lifting bars ensued by reason of the fact that the heaviest portion of the car is in front of the fulcrum 7. The extent to which the bars may tilt is readily controlled by the hand lever 14.

To lower the car, it is necessary only to again tilt the forward ends of the lifting bars 5 upward whereupon the car starts back, the front wheels rolling down the runways 10, and when the axles clear their supports, the latter are swung back to their normal position shown dotted in Fig. 3, by the springs 24. By the connection 25 and 26 the front and rear axle supports operate together, and the spring 26 serves to reduce the shock when the axles strike the supports. The forward movement of the axle supports is limited by the abutments 28.

I claim:—

1. A lifting device comprising tiltable lifting bars, runways mounted on the sides of the bars and extending on opposite sides of the fulcrum thereof, swinging front axle supports carried by the lifting bars in advance of the forward ends of the runways, swinging rear axle supports carried by the rear ends of the lifting bars, a connection between the front and rear axle supports, and a swinging prop for holding the front ends of the lifting bars elevated.

2. A lifting device comprising tiltable lifting bars, runways mounted on the sides of the bars and extending on opposite sides of the fulcrum thereof, said runways being inclined upward toward the forward ends of the lifting bars, front axle supports carried by the lifting bars in advance of the forward ends of the runways, rear axle supports carried by the rear ends of the lifting bars, and a swinging prop for holding the front ends of the lifting bars elevated.

3. A lifting device comprising tiltable lifting bars, runways mounted on the sides of the bars and extending on opposite sides of the fulcrum thereof, front and rear axle supporting means carried by the lifting bars, and means for holding the front ends of the lifting bars elevated.

4. A lifting device comprising tiltable lifting bars, runways mounted on the sides of the bars and extending on opposite sides of the fulcrum thereof, front and rear axle supporting means carried by the lifting bars, and a swinging prop for holding the front ends of the lifting bars elevated.

In testimony whereof I affix my signature in presence of two witnesses.

CHARLES O. BLEE.

Witnesses:
JAMES P. MURPHY,
LOUIS F. CROSBY.

Copies of this patent may be obtained for five cents each, by addressing the "Commissioner of Patents, Washington, D. C."